Oct. 28, 1952
A. O. SHELBY
2,615,794
CRYSTALLIZATION APPARATUS
Filed June 26, 1950
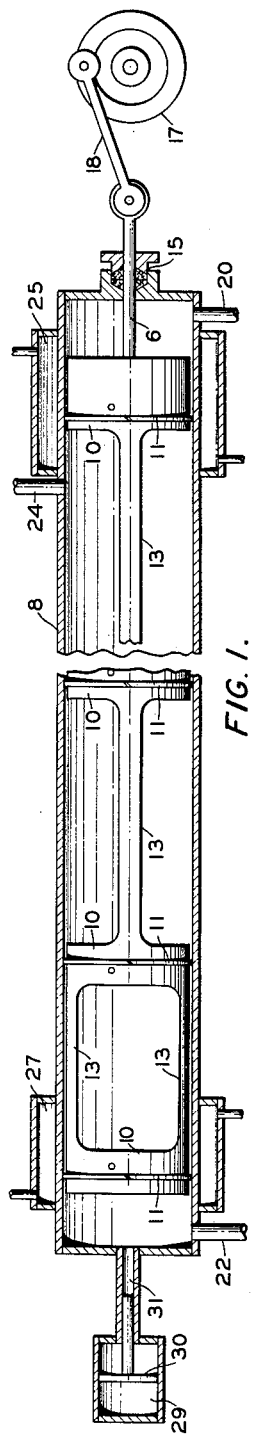
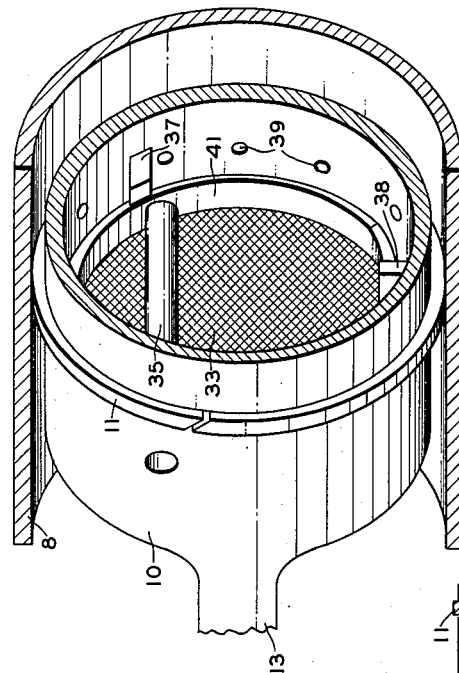
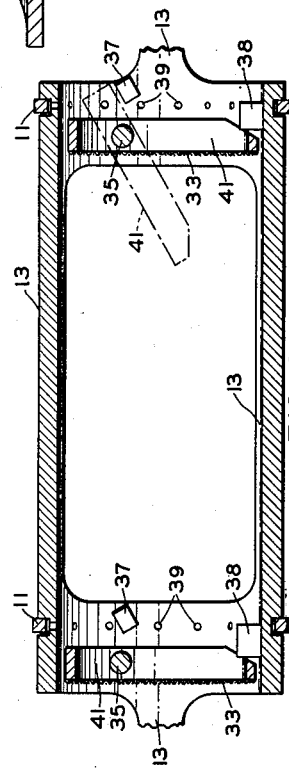
INVENTOR.
A. O. SHELBY
BY
Hudson and Young
ATTORNEYS Patented Oct. 28, 1952

2,615,794

UNITED STATES PATENT OFFICE 2,615,794

CRYSTALLIZATION APPARATUS

Anthony O. Shelby, Houston, Tex., assignor to Phillips Petroleum Company, a corporation of Delaware Application June 26, 1950, Serial No. 170,357

8 Claims. (Cl. 23—273)

This invention relates to crystallization apparatus. In one aspect, it relates to an apparatus for the separation of mixtures by multi-stage crystallization. In another aspect, it relates to an apparatus for efficiently moving a granular mass of crystallized material through a fractional crystallizer.

In the separation of mixtures of compounds by fractional crystallization, various types of apparatus have been constructed for establishing contact between a mass of the crystallized material moving in one direction and a mother liquor moving in the opposite direction. Usually these devices employ a flight conveyor or auger for moving the crystals. In most horizontal type crystallizers, a higher-melting fraction is removed from one end, a lower-melting fraction is removed from the opposite end and the feed is introduced at an intermediate point. The apparatus can be jacketed to abstract heat through the walls and form crystals in the liquid body, which usually fills the apparatus. The crystals that form in contact with a mother liquor are, ordinarily, the higher-melting fraction. In the case of mixtures which form eutectics, the crystals may or may not be the higher-melting component but will be that component present in excess of the eutectic ratio.

One of the principal difficulties with the devices of the prior art is that the crystal movers are not efficient if the ratio of solid to liquid becomes too high. When the amount of solid material is too high, the flights of the conveyors bridge over with crystals and no crystal movement occurs. It is necessary, if separation is to occur, that the crystals or solid granular material be continuously moved toward the outlet for the higher-melting fraction and that the remaining liquor be displaced toward the opposite end, where the lower-melting fraction is withdrawn.

I have invented a solid-moving device utilizing piston devices, which operates efficiently in any slurry of crystals in liquid and which does not become bridged over with the material being crystallized. My invention is particularly adapted to use in a crystallizer that is totally enclosed and has a freezing section near one end and an adiabatic section through which the crystals must be moved before reaching the product outlet. The apparatus of my invention has many advantages. Of particular importance are the features of a replaceable ring or band which is used to scrape solid material from the inner wall of the crystallizer, a minimum of moving parts through the use of a perforated disk valve inside a piston housing, and a maximum of space in the initial portion of the crystallizer when contacting of solids and mother liquor takes place.

The principal object of my invention is to provide a simple and efficient apparatus for moving crystals through a liquid-full container and displacing liquid in the opposite direction.

Another object is to provide a conveyor for use in multi-stage crystallization apparatus.

Another object is to provide a crystal conveyor for moving the solids of a slurry to one end of the crystallization apparatus countercurrently to the liquid.

Other objects and advantages of the apparatus of my invention will become apparent to one skilled in the art, upon reading this disclosure.

Figure 1 is a longitudinal sectional view of a horizontally disposed fractional crystallizer showing a preferred specific embodiment of my crystal conveyor in elevation;

Figure 2 is an isometric view of two connected perforated piston units of the preferred specific embodiment of my crystal conveyor which is shown in elevation and in place in Figure 1;

Figure 3 is an isometric view showing the construction of a preferred specific embodiment of the perforated piston assembly of my invention; and Figure 4 is a longitudinal sectional elevation of two connected perforated piston units of the preferred specific embodiment of my crystal conveyor which is shown in elevation and in place in Figure 1, and which is shown in the isometric view, Figure 2.

In Figure 1, a reciprocating rod 6 extends through the end wall of crystallizer 8. Pistons 10, having rings or bands 11 or close-fitting edges to scrape solid material from the inner wall of crystallizer 8, are connected together by connecting members 13 and spaced at intervals along crystallizer 8. One can use any suitable number of connecting members to connect the pistons, preferably rigidly connecting them so that they move in unison. The connecting members may be attached to the piston housing in any suitable manner. Stuffing box 15 seals the space around rod 6, which is caused to reciprocate by the movement of crank 17 and connecting rod 18, which are actuated by a driving means (not shown). Other means of reciprocating the pistons can be used satisfactorily. Product outlets 20 and 22 are at opposite ends of the apparatus, and feed inlet 24 is intermediate said ends. Cooling jacket 25 forms a freezing section on one end and heating jacket 27 forms a melting section on the opposite end. Cylinder 29 and piston 30 communicate with crystallizer 8 by means of a passageway 31 to make possible the maintenance of a desired pressure within said crystallizer.

In Figure 2, an isometric view of two connected piston units is shown. Inside of the outer housing or shell of pistons 10, the perforated valves or disks 33 are shown. These valves or disks are attached, preferably in their upper portion, to rods 35 which are pivotally attached to the housing or shell of the piston. These valves or disks are so designed that they turn on a reverse stroke of the piston, opening the space inside the piston housing and allowing solid material to pass through freely, and turn back on a forward stroke of the piston, closing the space inside the piston housing, preventing solid material from passing through the space and allowing liquid to pass through, thus moving solid material through crystallizer 8 while in contact with mother liquor.

Figure 3 is an isometric view of the preferred specific piston embodiment of my apparatus, showing structure and placement in crystallizer 8. Stop 37 which is attached to the piston housing, prevents disk or valve 33 from turning too far on a reverse stroke of piston 10, that is, it is kept from turning 90° or stopped short of dead-center so that the valve will close on a forward stroke of the piston when the disk or valve is pushed against solid material in the crystallizer. Stop 38, which is attached to the piston housing or shell, maintains valve or disk 33 in a transverse position during the forward stroke of piston 10 so that the space in the housing is closed, thus solid material is moved forward through crystallizer 8. Other suitable stopping means can be used, if desired. Holes 39 through the housing or shell under ring or band 11 are preferably used to relieve pressure when solid material or liquid builds up under the ring or band 11. Perforated disk or valve 33 is preferably supported on ring or band 41. If disk or valve 33 has sufficient strength in itself, ring or band 41 can be dispensed with.

Figure 4 shows a longitudinal sectional view of the piston assembly. Disk or valve 33 is shown in its open position (dotted lines) and its closed position (solid lines). Rings or bands 11 are shown in their preferred position, that is recessed in the piston housing or shell. As can be seen in this figure space between disk or valve 33 and the piston housing is provided so that the valve will open the desired amount to let solid material pass through.

The device of my invention is designed for the purpose of moving a mass of granular solid through a confined body of the mother liquor, which is thereby displaced in a direction countercurrent to the movement of the crystals. This device eliminates a major difficulty resulting from bridging across the flights which usually occurs with augers or flight conveyors.

By using my apparatus, the crystals formed in the freezing zone are scraped from the walls by the outer ring or band 11 and are pushed forward through the crystallizer by the perforated pistons. At the same time, liquid is displaced in the opposite direction and flows through the perforations in the piston. On the reverse stroke, the disk or valve 33 turns to form an opening of considerable size. These valves are prevented from turning 90° or to a horizontal position by stop 37. This prevents the valve from coming to rest on dead center and failing to close on the forward stroke. As the forward stroke begins, the resistance of the solid in the solution forces the valve back against stop 38 and thereby forms a piston again.

The pistons of my device are entirely automatic and open and close freely with the motion of the reciprocating rod or other means to reciprocate the pistons. My device is operable as long as the mixture in the crystallizer is maintained as a slurry. If the crystals are melted and a portion of the melt is caused to flow toward the freezing end as reflux, my device will be operable under conditions of complete reflux. If the crystals are not melted in the apparatus but are removed as solid material, it is obvious that this removal must occur at the same rate that the material is delivered to the end of the apparatus. Otherwise, there would be a building up of solid material in the end of the apparatus which could result in damage to the pistons.

The perforated disks or valves can be made of any foraminous material which will permit the flow of liquid therethrough without substantial resistance and at the same time will retain granular material. It does not affect the operation if some small crystals do pass through the piston along with the liquid. These crystals are probably impure and more closely approximate the composition of the liquid than do the larger crystals which are retained on the piston. I have found that a 20 or 30 mesh screen is excellent for this purpose.

The screen for the valves is preferably secured to a reinforcing ring 41. This gives structural strength to the valves. The screen can be secured to the reinforcing ring by any desired method but I have found soldering to be very convenient. The disks or valves should turn freely, not requiring much force to turn them to the proper position.

Instead of stops 37 and 38, which are soldered to the inner wall of the piston housing, any other convenient method for maintaining the valves in the proper position can be used. Bars or rods can be used.

In the drawings, my apparatus is shown in a horizontal position. However, it may be operated in a vertical or inclined position, and, in some instances, such positions are preferable. In operating with the crystallizer full, or substantially full of slurry, the slurry would offer sufficient resistance to the disks or valves to cause said disks or valves to close on the pump stroke and open on the intake stroke. My apparatus is not limited to operation at any certain pressure but is operable at constant or pulsating pressures ranging from sub-atmospheric to superatmospheric pressures. It is possible to use a feed comprising crystalline material. The operation of my apparatus is still the same. It is also possible to operate the apparatus in a non-horizontal position with the melting section at the elevated end. The solids moving device of this invention is similar to that disclosed in the copending patent application of J. A. Weedman, Serial Number 111,618, filed August 22, 1949, and the copending patent application of D. L. McKay, Serial Number 134,225, filed December 21, 1949. Patent application Serial Number 111,618 discloses a solids moving device wherein the piston comprises a plurality of flap valves or a folding piston. Patent application Serial Number 134,225 discloses an elliptical folding piston, the opening and closing of which is not dependent upon a reciprocating means but rather is positively controlled and actuated by motor means.

The advantages of my invention will be more clearly understood from the following example. It is to be understood that the quantities, sizes, compositions, etc. set forth in the example are not to unduly limit the scope of my invention.

EXAMPLE

The following tests were carried out to determine the maximum amount of high purity benzene to be obtained by crystallization from a benzene n-heptane feed in a crystallizer using first an auger-type conveyor, and then a perforated piston-type conveyor, like that shown in Figures 1, 2, 3 and 4. The crystallizer tube was a 10 foot section of 2 inch tubing with an 18 inch freezing section at one end and an 8 inch melting section at the opposite end. The whole crystallizer tube was insulated against heat leakage by at least 4 inch thick insulation.

In the first tests, it was found that the auger conveyor would not operate if the amount of crystals in the mixture exceeded about 5 per cent of the mixture. The output of high-melting product (benzene) dropped off rapidly as the purity of the product increased. At 98 per cent purity, the high-melting product was only 1.6 volume per cent of the feed, which is a very low quantity for such a process. From these results, it is obvious that the crystallizer was being operated at about the maximum output for the purity of the product.

With the perforated piston conveyor, the purity of the high-melting product was appreciably higher and the feed rate was a great deal higher than that obtained with the auger conveyor. The rate of output of the high-melting product was greater when using the perforated pistons.

The data in the following table are the results of the tests just described. The advantages of my invention will be more clearly demonstrated and understood from a study of the following table.

Table

USING AUGER

| Feed | Rates, ml./min. | | | Feed | Compositions, wt. percent Benzene | |
|---|---|---|---|---|---|---|
| | Low-Melting Product | High-Melting Product | | | Low-Melting Product | High-Melting Product |
| | | Rate | Vol. Percent of Feed | | | |
| 3.08 | 2.64 | 0.44 | 14 | 46.4 | 14.5 | 75.3 |
| 2.77 | 2.51 | 0.26 | 9.0 | 46.2 | 14.0 | 87.5 |
| 6.3 | 6.0 | 0.3 | 4.8 | 59.5 | 18.5 | 90.0 |
| 6.1 | 6.0 | 0.1 | 1.6 | 56.2 | 42.2 | 98.0 |

USING PERFORATED PISTONS

| 60.7 | 53.7 | 7.0 | 11.6 | 73.2 | 69.1 | 98.6 |
| 120 | 100.7 | 19.3 | 16.1 | 73.2 | 71.6 | 94.6 |

If desired, an indicator may be installed in connection with said valves or disks to indicate when the valves or disks are opening and closing properly. This would also indicate whether or not optimum operating conditions were being maintained since the valves would fail to operate only in case the mixture inside the crystallizer become entirely liquid or the ratio of solid to liquid became too great. Such an indicating device is entirely within the scope of my invention.

As will be evident to those skilled in the art, various modifications of this invention can be made, or followed, in the light of this disclosure and discussion, without departing from the spirit or scope of this disclosure or from the disclosure of the claims.

I claim:

1. Fractional crystallization apparatus which comprises, in combination, a horizontally disposed, cylindrical, elongated, enclosed container, a product outlet adjacent each end of said container and a feed inlet intermediate said ends, means for adding heat to said container adjacent one end thereof, means for abstracting heat from said container along a portion thereof between said feed inlet and an unheated end, and means for moving solid granular material through said container from a cooled to a heated end which comprises, a reciprocating rod extending axially into said container, a plurality of reciprocating perforated pistons transversely positioned at spaced intervals within said container, an end one of said perforated pistons being rigidly attached at its outer end to said reciprocating rod, each of said perforated pistons comprising, a cylindrical housing, a piston ring around said cylindrical housing and recessed therein adapted to engage the inner wall of said container, a plurality of holes through each of said cylindrical housings under said rings, a pair of diametrically opposite, connecting members rigidly connecting each of said cylindrical housings to adjacent cylindrical housings at the ends thereof, each of said pair of connecting members being disposed 90 degrees from each adjacent pair of said members, a perforated, circular disk valve within each of said cylindrical housings, each of said valves being rigidly attached in their upper portions to a horizontally disposed rod which is pivotally attached to said cylindrical housings, said valves being adapted to assume a transverse position and close the openings in said cylindrical housings on a forward stroke and to open the openings in said cylindrical housings on a return stroke of said pistons, a first stop rigidly attached to the inner wall of each of said cylindrical housings adapted to maintain said valves in said transverse position on a forward stroke of said pistons, a second stop rigidly attached to the inner wall of each of said cylindrical housings adapted to stop movement of said valves at an angle less than 90 degrees from said transverse position on a return stroke of said pistons, and actuating means connected to said reciprocating rod.

2. Fractional crystallization apparatus which comprises, in combination, an elongated vessel, a product outlet in each of the end portions of said vessel, a feed inlet intermediate said end partions of said vessel, means for adding heat to an end portion of said vessel, means for abstracting heat from said vessel along an end portion thereof between said feed inlet and an unheated end, and means for moving solid granular material through said vessel from said cooled end portion to said heated end portion which comprises, a plurality of reciprocatable perforated pistons spaced at intervals inside said vessel, each of said perforated pistons comprising a housing inside of which is a movable perforated valve adapted to close on an intake stroke and open on a pump stroke of said piston, said piston housings being connected to adjacent piston housings, and means to impart a reciprocating motion to said pistons.

3. In a crystallizer of the type described, a solid-conveyor which comprises, in combination, a plurality of reciprocatable perforated pistons disposed at spaced intervals within said crystallizer, each of said perforated pistons comprising a housing inside of which is a movable perforated valve, said valve being hingedly connected to said housing end, said piston housings being connected to adjacent piston housings, and stopping means to prevent said valves from opening on a forward stroke of said pistons.

4. In a crystallizer of the type described, an improved mechanism to convey solid material which comprises, in combination, a plurality of reciprocatable perforated pistons disposed at spaced intervals in said crystallizer, each of said perforated pistons comprising, a housing inside of which is a perforated valve, said piston housings being connected to adjacent piston housings, stops attached to said housings to prevent said valves from opening on a forward stroke and from fully opening on a reverse stroke of said pistons, a band at the periphery of said pistons for scraping solidified material from the wall of said crystallizer, and means for reciprocating said pistons.

5. In a crystallizer of the type described, a solid conveyor which comprises, in combination, a plurality of reciprocatable perforated pistons disposed at spaced intervals within said crystalizer, each of said perforated pistons comprising a housing inside of which is a perforated valve, said piston housings being connected to adjacent piston housings, stopping means to prevent said valves from opening on a forward stroke of said pistons, stopping means to prevent said valves from opening fully on a reverse stroke of said pistons, and means to reciprocate said pistons.

6. In a fractional crystallizer which comprises, a horizontally disposed elongated container and a crystal-conveyor, an improved conveyor which comprises, in combination, a plurality of reciprocatable perforated pistons disposed at spaced intervals in said container, each of said pistons being directly connected to adjacent pistons at their peripheries and comprising, a housing inside of which is a perforated disk attached to and turning on a horizontally disposed rod pivotally attached to said housing, a stop to hold said disk in a vertical position on a forward stroke of said piston, a stop to stop said disk short of a dead-center position when turning on a reverse stroke of said piston, a ring around said housing to scrape material from the inner wall of said conrocate.

tainer, and means to cause said pistons to reciprocate.

7. An apparatus for moving solid granular materials through an enclosing container which comprises, a reciprocating rod extending axially into said container, a plurality of reciprocating perforated pistons transversely positioned at spaced intervals within said container, an end one of said perforated pistons being rigidly attached at its outer end to said reciprocating rod, each of said perforated pistons comprising, a cylindrical housing, a piston ring around said cylindrical housing and recessed therein adapted to engage the inner wall of said container, a plurality of holes through each of said cylindrical housings under said rings, a pair of diametrically opposite connecting members rigidly connecting each of said cylindrical housings to adjacent cylindrical housings at the ends thereof, each said pair of connecting members being disposed 90 degrees from each adjacent pair of said members, a perforate, circular disk valve within each of said cylindrical housings, each of said valves being rigidly attached in their upper portions to a horizontally disposed rod which is pivotally attached to said cylindrical housings, said valves being adapted to assume a transverse position and close the openings in said cylindrical housings on a forward stroke and to open the openings in said cylindrical housings on a return stroke of said pistons, a first stop rigidly attached to the inner wall of each of said cylindrical housings adapted to maintain said valves in said transverse position on a forward stroke of said pistons, a second stop rigidly attached to the inner wall of each of said cylindrical housings adapted to stop movement of said valves at an angle less than 90 degrees from said transverse position on a return stroke of said pistons, and actuating means connected to said reciprocating rod.

8. An apparatus for moving solid granular materials through an enclosing container which comprises a reciprocating rod extending axially into said container, a plurality of reciprocating perforated pistons transversely positioned at spaced intervals within said container, an end one of said perforated pistons being rigidly attached at its outer end to said reciprocating rod, each of said perforated pistons comprising, a cylindrical housing, a piston ring around said cylindrical housing and recessed therein adapted to engage the inner wall of said container, a plurality of holes through each of said cylindrical housings under said rings, a pair of diametrically opposite, connecting members rigidly connecting each of said cylindrical housings to adjacent cylindrical housings at the ends thereof, each of said pair of connecting members being disposed 90 degrees from any adjacent pair of said members, a perforated circular disk valve within each of said cylindrical housings, each of said valves being rigidly attached in their upper portions to a horizontally disposed rod which is pivotally attached to said cylindrical housings, said valves being adapted to assume a transverse position and close the openings in said cylindrical housings on a forward stroke and to open the openings in said cylindrical housings on a return stroke of said pistons, and actuating means connected to said reciprocating rod.

ANTHONY O. SHELBY.

No references cited.